INVENTORS
JOHN OSBORNE HAW and
HORACE JACKSON KIMBROUGH
BY
ATTORNEY

Patented Nov. 25, 1952

2,619,188

UNITED STATES PATENT OFFICE 2,619,188

MONOFILAMENT SCREEN PACK

John Osborne Haw, Chester, and Horace Jackson Kimbrough, Richmond, Va., assignors to E. I. du Pont de Nemours & Company, Wilmington, Del., a corporation of Delaware Application March 15, 1950, Serial No. 149,804

2 Claims. (Cl. 183—69)

This invention relates to improvements in the recovery of heat. More particularly, it relates to heat recovery from acid coagulating bath evaporators. Still more particularly, this invention relates to direct contact recovery of water vapor evaporated from viscose coagulating baths and even more specifically to means for entraining and removing undesirable contaminates from the coagulating bath vapor so that the recovered water may be used for washing rayon or other regenerated cellulose structures.

A rayon plant requires a tremendous amount of steam, most of which is used in connection with evaporation and concentration of coagulating bath with the removal therefrom of water and for heating wash water which is used at the rate of several millions of gallons per day for washing and purifying viscose rayon. Hundreds of tons of water are evaporated each day in reconditioning coagulating and regenerating baths and in the past much of the heat contained in the water vapor was lost by condensing the same with raw water and discarding the resulting contaminated water. One of the most economical and efficient forms of heat exchange is to utilize the vapors obtained from evaporation of water from coagulating baths to heat, by direct contact, the soft water suitable for washing cakes of rayon or the like. The main drawback to this system is contamination of the water by acid or acid salts entrained with the vapor and carried along and contained in the condensate.

In recent years the undesirable entrainments that would have previously appeared in the hot condensed water were reduced, by use of an entrainment separator, from the order of 500–1,000 parts per million or more down to less than 50 parts per million. Tests on using the resultant hot water for the washing of packages of rayon yarn have been shown to give satisfactory washing results. One type of entrainment separator located between the normal separator and the condenser is comprised of a screen bed made up of several layers of crimped, knitted wire of metal alloy having a high resistance to corrosion, its construction being such that there is a very high percentage of free volume and a very large surface area. For example, the free volume may be of the order of 98% of the total volume and the exposed surface area of the wires may be of the order of about 130 sq. ft./cu. ft. of over-all screen volume. The several layers of crimped screening will be built up to a total thickness of the order of 4–8 or 10 inches, depending on the mesh, the height of crimp, the size of the wire, etc. As previously indicated, these metal wire knitted and crimped screen packs have satisfactorily reduced the amount of entrainment carried over by the vapors so that the vapors can be used directly for heating soft water, thereby becoming condensed and the warm water resulting therefrom can be used directly for the washing of viscose rayon cakes. If desired, the water before being passed on to the wash racks may be treated with sodium carbonate or sodium bicarbonate solutions or with some other alkaline reagents to neutralize the same and provide a slight excess of alkali if desired.

In spite of the great economic advantage in being able to convert the hot vapors from the coagulating bath evaporators into a truly useful form, i. e., hot water for purification of rayon yarn, the major obstacles have been materials of construction of the entraining screen. Relatively corrosion-resistant alloys of nickel and chromium, which seem to be among the best of the metallics, have had a useful life of not more than 90 days. This rapid deterioration has been a real bottleneck in expansion or extension of this general design. While tests on molybdenum alloys (Hastelloy) indicates a probable life of 5–10 years, their cost is exceedingly and prohibitively high. The high cost of these metal alloys coupled with the cost of knitting the relatively fine wires, crimping the wire fabric, and assembling the entire structure of several layers of crimped, knitted wire fabric has held back this otherwise attractive and efficient recovery of heat and water.

It is, therefore, an object of this invention to provide an improved screen pack for the entrainment of undesirable contaminates in the water vapor coming from the coagulating bath evaporators. Another object of this invention is to provide a simple, economical way of preparing suitably crimped fabric materials and a suitably built up multi-layer entrainment unit that will withstand chemical corrosion so that the entrainment unit may be used over a period of many months with good efficiency insofar as separation of harmful contaminates from the water vapor and throughput of the vapor is concerned. Other objects will be apparent from the description that follows.

In the figures, which are given for illustrative purposes only,

This invention comprises a new self-supporting, corrugated, open mesh woven screen of Saran monofilament and the process of using it in a multi-layer form to entrain undesirable components carried along with the vapors. It is particularly suited in the recovery of water evaporated from acid coagulating baths. Of the number of plastic materials considered and tried, only those containing a major portion of vinylidene chloride have been found satisfactory. The useful polymers are polyvinylidene chloride or a copolymer of vinylidene chloride with vinyl compound, such as vinyl chloride or vinyl cyanide, known as Saran, containing at least 85% of vinylidene chloride, such as proportions of about 90:10. The screen is made up of monofilaments in the range from 0.012"–0.030" diameter. Such screens are by far the most effective and usable for use in the form previously described.

The structure of the screen is very important. Multifilament Saran lacked the rigidity and stiffness needed and could not be used. Even when Saran monofilaments were knitted instead of woven, the fabric could not be suitably shaped to hold up and maintain its porous open volume structure for any reasonable length of time. It was only when the monofilaments of Saran in the range of sizes given and preferably between 0.015" and 0.025" diameter were woven in a simple weave of from 5 x 5 and up to about 16 x 16 that a really useful material was provided. At the upper limit of 16 x 16, flooding and excessive pressure drops occurred so that the preferred range is around 8 x 8 and from 6 x 6 to 12 x 12. If fewer strands are used than 5 x 5, the desired separation is not effected. It is understood, of course, that the closeness of the weave is dependent upon the size of the monofilament and the coarser diameter filaments are generally preferred and spaced not too closely together.

Figure 2:
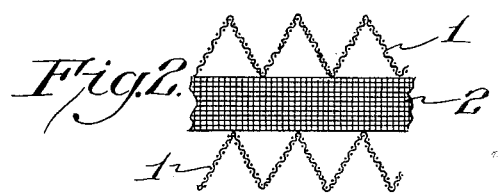
Figure 2 is a cross-sectional view of a portion of the screen pack of this invention.
Figure 3:
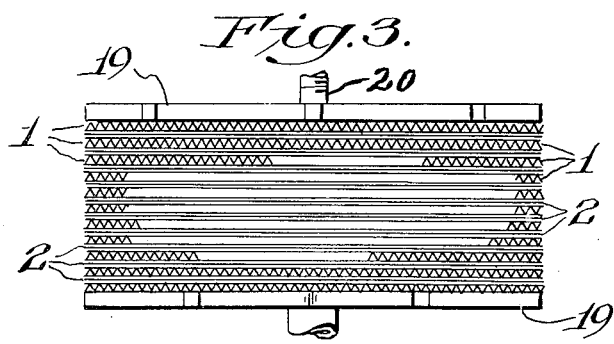
Figure 3 shows a full screen pack.

The woven material is preferably crimped or corrugated in a sharp V-shape, saw tooth pattern, the distance between the depth of the valleys and the height of the peaks being about ½" although this may be varied somewhat, say between ¼" and ¾". This permits greater area and also the essential screen support within the pack. As shown in Figure 2, the screen 1, is woven and is crimped and a number of these crimped sheets were then piled together reversing the direction of crimp about 90° with each succeeding layer until 20 to 30 sections were built up, the number depending more or less upon the depth of the crimp. As can be seen in Figure 2 screen 2 is at 90° to the screens adjacent to it. This angle may be varied widely; any degree that avoids meshing of the corrugations may be used. Figure 3 shows a pack of screens forming the screen bed. The screen beds are packed down somewhat so that a bed of 25 sections, each made with ½" depth of crimp, when mounted between supporting spiders may have an over-all thickness of only about 7". If coarser screens are made and if greater depth of crimp is applied to them, the over-all thickness of the bed may run up to a total thickness of 10" or more with satisfactory results from the standpoint of entrainment and pressure drop. In other cases, the thickness of the crimped screen pile may be only a matter of 3" or 4". Excellent results have been obtained by preparing a woven screen of Saran monofilaments 8 to the inch each way, each wire or monofilament being 0.020" in diameter and the fabric or screen crimped in the apparatus previously mentioned so as to form crimps of ½" depth.

A screen bed is built up from, say, 25 sections of Saran screen thus crimped with the corrugation of each succeeding layer turned about 90° with respect to the earlier layer. This is supported between rubber covered supporting spiders 19 by means of a stainless steel bolt and nut with stainless steel spacer sleeves over the central stainless steel bolt 20. Any convenient supporting means, may, of course, be used. It is best the weight of the top support be not borne by the screen bed. The screen is used at any convenient place in the vapor stream.

Figure 1:
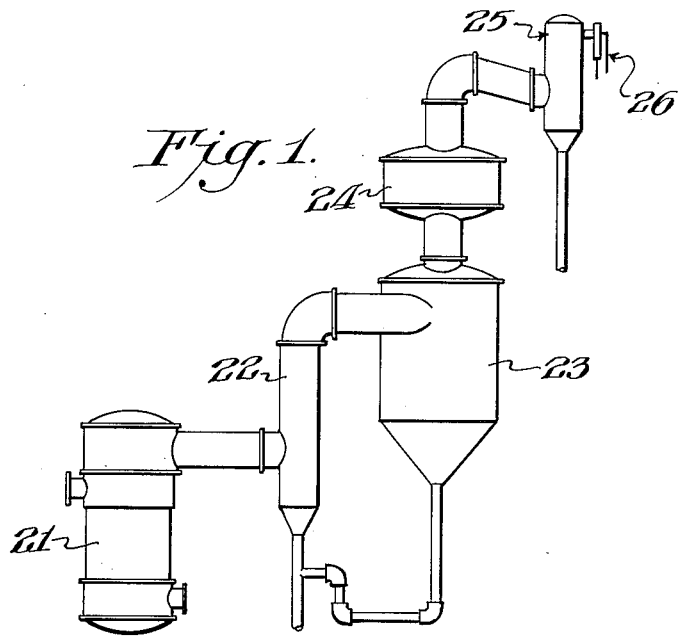
Figure 1 shows the location of screen separator unit in a particular process.

In Figure 1 vapor passes from the steam chest 21 to flash chamber 22 to centrifugal separator 23 to screen separator 24 and hence to condenser 25 and ejector 26. The screen bed in the separator 24 may be mounted so that the weight of the top supporter rests on the walls of the housing about the screen bed or the top spider may be locked on the central bolt 20 so that it does not rest in the screen bed. When the screen bed of this invention is used in the screen separator unit, deleterious carry-over into the condenser is reduced from 60 to 95% depending on the evaporator load. At a low rate of evaporation the undesirable entrainment carry-over without this screen separator is about 5 or 10%, the entrainment carry-over resulting when the evaporator is operating at or above capacity. In such cases the percentage improvement is not so great, being of the order of 60%, but even in this case the small entrainment carried over by the vapors is more than cut in half. On the other hand, at a high load when a 250 ton/day evaporator is boiling off at above its rated capacities, at say 300 to 400 tons of water per day, the separation efficiency is very high and from 85 to 95% of the undesirable entrainment previously carried over is eliminated by this screen separator. When this vapor is condensed with soft water, thereby heating the soft water, the amount of bath contamination in that composite is no more than about 50 parts per million, which is sufficiently low that this water can be used directly without any treatment at all for the washing of acid cakes of viscose rayon yarn. The yarn thus produced is of the same normal physical properties previously obtained using softened water and heated to the same temperature through a common tube heat exchanger. It is to be understood, of course, that this recovered condensate admixed with soft water may be treated if desired with an alkaline reagent such as with sodium carbonate, sodium bicarbonate, ammonium hydroxide, or even sodium hydroxide to provide a slightly alkaline wash if desired.

It is also possible by means of this screen separator to operate the evaporator at loads above its rated capacity and maintain the entrainment at levels sufficiently low to permit reuse of the water. Still further, the screen packs of this invention have exceedingly long usefulness, the life of a screen being more than one year.

Any departure from the above description which conforms to the present invention is intended to be included within the scope of the claims.

We claim:

1. A self-supporting screen pack comprising a plurality of woven, crimped screens prepared from monofilaments of polymeric material containing a major portion of vinylidene chloride selected from the group consisting of polyvinylidene chloride, vinylidene chloride/vinyl chloride copolymer and vinylidene chloride/vinyl cyanide copolymer, said monofilaments being from 0.012 to 0.030 inch in diameter and each of said screens containing from 5 x 5 to 16 x 16 such monofilaments per inch.

2. A self-supporting screen pack in accordance with claim 1 wherein the direction of crimp of each screen is at an angle of about 90° to that of screens adjacent to it.

JOHN OSBORNE HAW.
HORACE JACKSON KIMBROUGH.

REFERENCES CITED

The following references are of record in the file of this patent:

UNITED STATES PATENTS

| Number | Name | Date |
| --- | --- | --- |
| 2,355,822 | Rugeley | Aug. 15, 1944 |
| 2,367,227 | Lowther | Jan. 16, 1945 |
| 2,394,208 | Schaaf | Feb. 5, 1946 |
| 2,443,238 | Glanzer | Jan. 15, 1948 |
| 2,463,722 | Spraragen | Mar. 8, 1949 |
| 2,479,722 | Brixius | Aug. 23, 1949 |
| 2,495,761 | Platt | Jan. 31, 1950 |